Oct. 21, 1941.                F. E. DEREMER                 2,259,516
                          SILENCER CONSTRUCTION
                           Filed Sept. 23, 1940
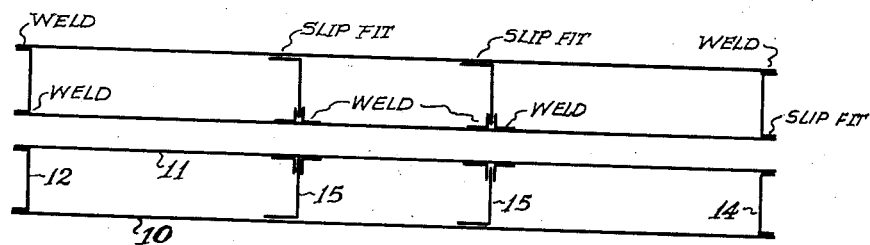
Fig. 1
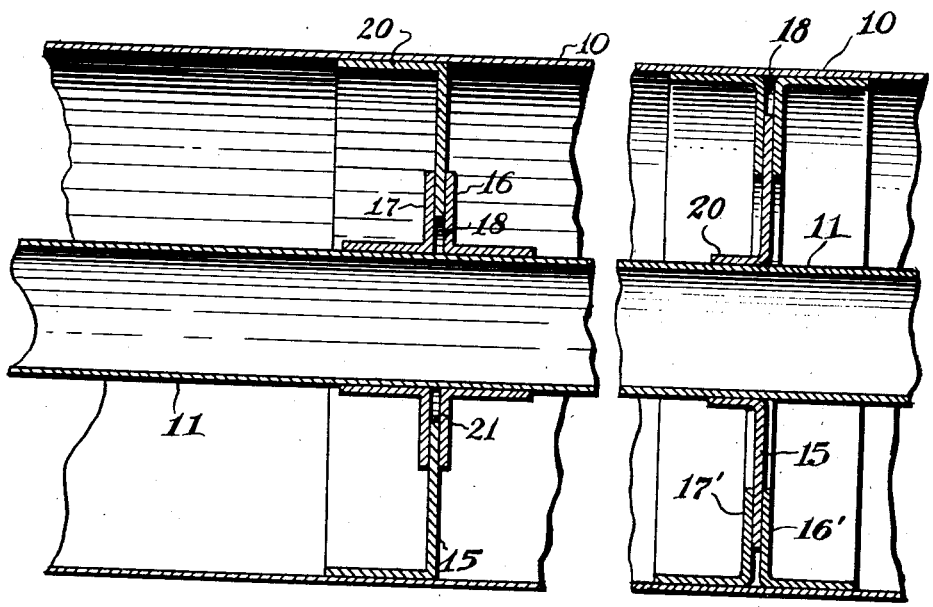
Fig. 2.                    Fig. 3.
                                                    INVENTOR.
                          BY    Floyd E. Deremer
                                Daniel G. Cullen Patented Oct. 21, 1941

2,259,516

UNITED STATES PATENT OFFICE 2,259,516

SILENCER CONSTRUCTION

Floyd E. Deremer, Detroit, Mich.

Application September 23, 1940, Serial No. 357,886

1 Claim. (Cl. 181—61)

This application relates to muffler or silencer constructions.

Embodiments of the invention are disclosed in the appended drawing merely by way of example. Referring to the drawing it will be seen that Figure 1 is a diagram of a conventional muffler construction provided with my novel arrangement for mounting a diaphragm on an inner tube, and Figure 2 is an enlarged fragmentary view.

Fig. 3 shows an alternate construction.

Referring to Figure 1 it will be seen that this figure shows inner and outer tubes 10 and 11 which are relatively telescoped and which are arranged for relative longitudinal movement. One end of tube 10 is closed by an end header 12 welded thereto and to which one end of tube 11 is welded. The other end of tube 10 is closed by an end header 14, welded thereto, in which an end of the inner tube 11 is disposed with a tight but sliding or slip fit. A diaphragm 15 is disclosed as mounted on the inner tube 11 and having a sealing but sliding or slip fit engagement with the outer tube 10.

In conventional construction, diaphragm 15 would be welded to the inner tube. Thus, in the event the inner tube is bowed downwardly with respect to the outer tube, the lower half of the outer edge or flange of the diaphragm 15 engages the outer tube 10 tightly, in fact so tightly, that relative movement of the diaphragm and outer tube is either impossible or if it does take place, is accompanied by objectionable clinking noises. On the other hand, the upper part of the diaphragm 15 will not engage the outer tube at all and consequently leakage past the diaphragm will be possible.

It is to overcome these objections that the arrangement shown, which is merely indicative of various arrangements that might be employed for this purpose, has been provided. Referring to Figure 2, it will be seen that this figure shows the inner tube 11 as provided with two annular collars or plates 16, 17 welded to the inner tube and having a space 18 between them, and forming a collar in which is telescoped the diaphragm 15 whose outer flanged edge 20 is intended to engage the outer tube without excessive friction at any part thereof and without excessive clearance at any part thereof. The diaphragm 15 is formed with a center hole 21 considerably larger in diameter than the inner tube 11 and is so disposed in space 18 as to be movable transversely of the inner tube to accommodate itself to variation in the dimension of the space between the inner and outer tubes. The collars 16—17 restrain the diaphragm against longitudinal movement with respect to the inner tube but permit the diaphragm to shift transversely for the purposes indicated. Such shifting permits the diaphragm to assume its proper position with respect to the outer tube and all of the objections which are attendant to the conventional construction described above, where the diaphragms are welded to tube 11, are thereby eliminated.

Instead of the diaphragms being anchored to the inner tube 11 against longitudinal movement and mounted to shift transversely with respect to that inner tube 11, a reverse construction might be employed see Fig. 3 wherein the diaphragm is carried by the outer tube in a manner similar to that indicated, wherein the diaphragm is carried by the inner tube. Thus, there might be disposed on the outer tube collars 16'—17' so that the diaphragm 15 is restrained against longitudinal movement with respect to the outer tube and is yet permitted to shift transversely with respect to the outer tube.

Now having described the embodiments herein disclosed, reference should be had to the claim which follows for a determination of the invention.

I claim:

In a silencer comprising relatively telescoped inner and outer tubes provided with end headers for connecting and laterally spacing them, and arranged for permitting limited relative longitudinal and lateral movement of the tubes, an annular diaphragm traversing or bridging the space between the tubes, a collar anchored to one tube and telescopically connected to the diaphragm so as to seal the space between the diaphragm and said tube and to anchor the diaphragm against longitudinal movement with respect to said tube and to permit relative transverse movement of the diaphragm and said tube, the other edge of the diaphragm being in sealing relation with the other tube, whereby the other tube is movable longitudinally with respect to the diaphragm and the tube having the collar.

FLOYD E. DEREMER.